July 12, 1955  M. C. McCREARY  2,713,111
ELECTRICALLY HEATED LUNCH BOXES

Filed Sept. 10, 1954  2 Sheets-Sheet 1

Marcus Cota McCreary
INVENTOR.

BY *Clarence A. O'Brien*
*and Harvey B. Jackson*
Attorneys

July 12, 1955  M. C. McCREARY  2,713,111
ELECTRICALLY HEATED LUNCH BOXES
Filed Sept. 10, 1954  2 Sheets-Sheet 2
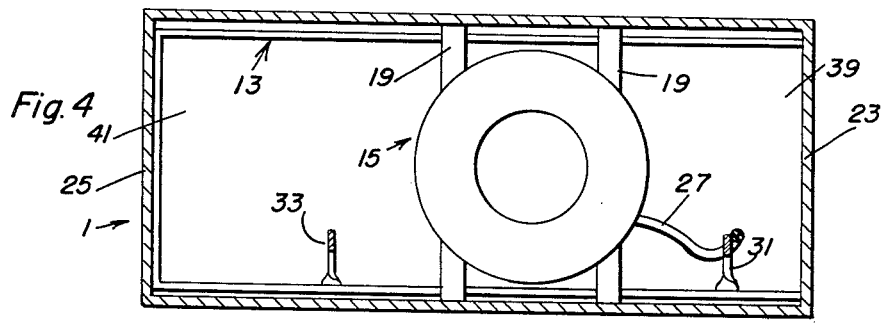
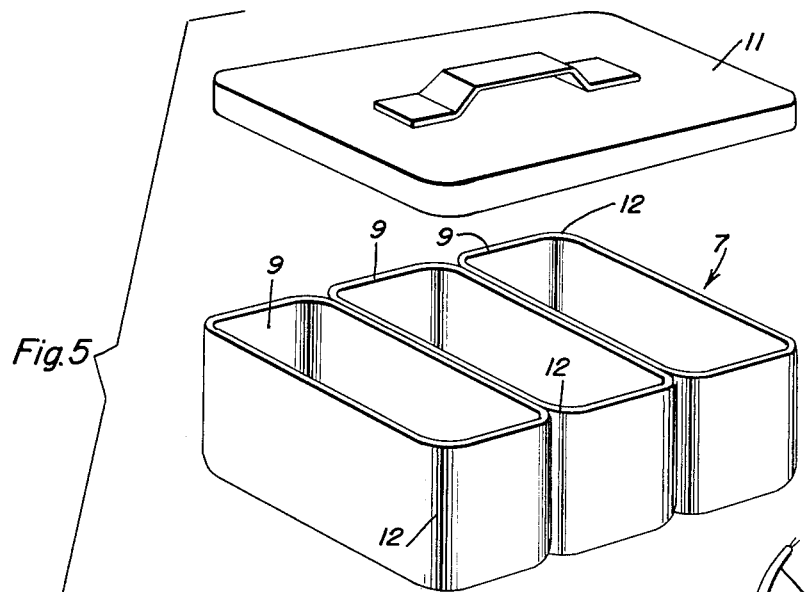
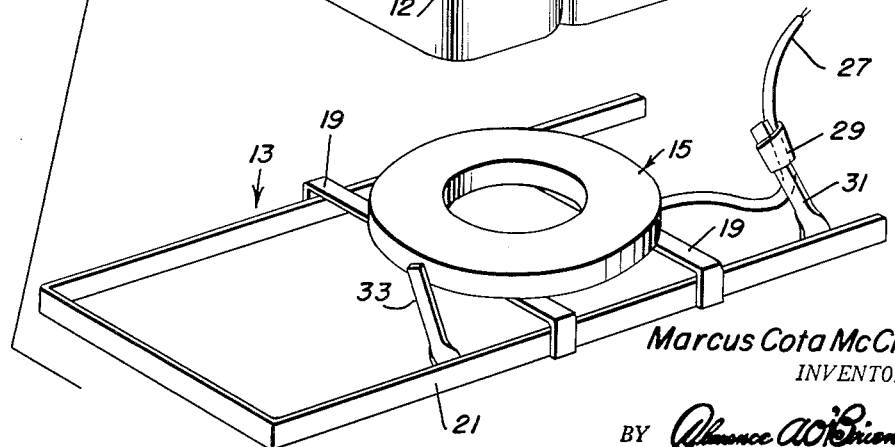
Marcus Cota McCreary
INVENTOR.

United States Patent Office 2,713,111
Patented July 12, 1955

2,713,111

ELECTRICALLY HEATED LUNCH BOXES

Marcus Cola McCreary, Florence, Ala.

Application September 10, 1954, Serial No. 455,161

1 Claim. (Cl. 219—35)

My invention relates to improvements in electrically heated lunch boxes of the multiple food container type.

The primary object of my invention is to provide the conventional type of workman's lunch box with means for carrying in separated relation a number of foods and for warming all of the foods while the lunch box is closed or only certain of the foods with the lunch box open.

Another object is to accomplish the above without appreciably increasing the cost of such lunch boxes.

Other and subordinate objects together with the precise nature of my improvements will become readily apparent when the following description and claim are read with reference to the accompanying drawings in which:

Figure 4 is a view in horizontal section taken on the line 4—4 of Figure 2; and

Figure 5 is an enlarged perspective exploded view of the means comprising my improvements.

Figure 1:
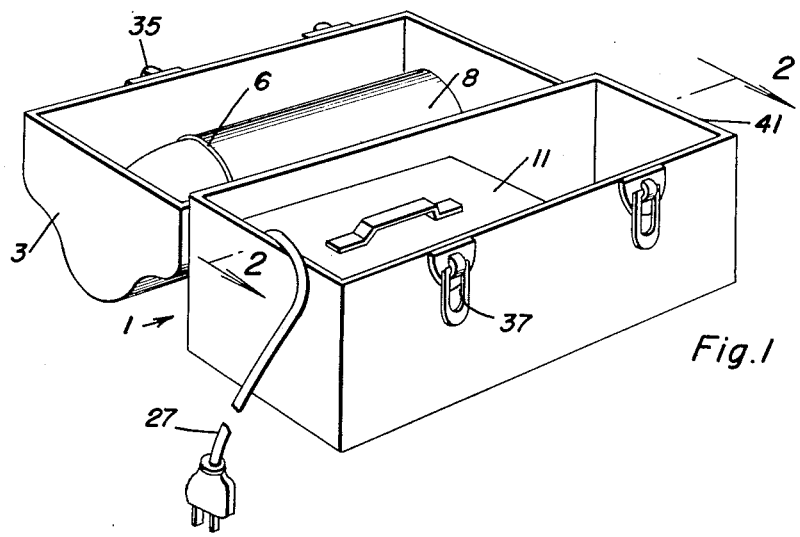
Figure 1 is a perspective view of my improved lunch box open to show the interior thereof.
Figure 2:
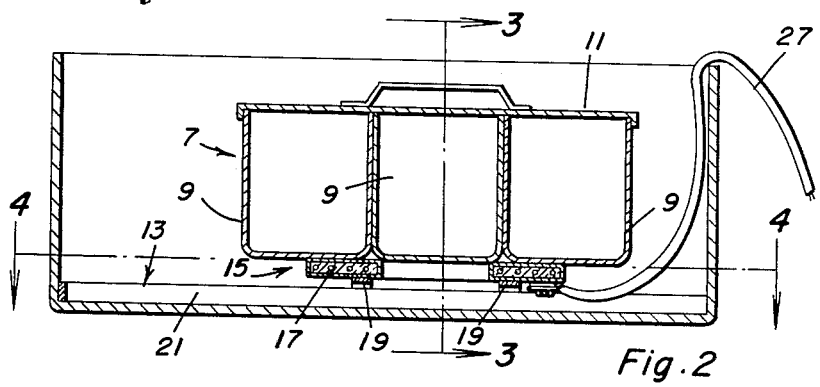
Figure 2 is an enlarged view in vertical longitudinal section taken on the line 2—2 of Figure 1.
Figure 3:
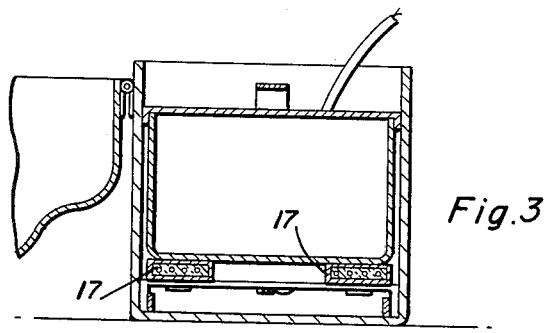
Figure 3 is a view in transverse section taken on the line 3—3 of Figure 2.

Referring to the drawings by numerals, the type of lunch box with which my invention is concerned comprises an oblong rectangular box body 1, having a hollow cover 3 hinged at one side thereof, as at 5, to one side of the body 1 for opening and closing, and which is of dome-shape in cross-section for receiving the usual Thermos bottle 8 therein, held therein by a clip 6.

According to my invention, a multiple container unit 7 for food is provided for positioning in the body 1 and which is substantially shorter than said body and of less depth and comprises a plurality, preferably three as shown, of like food containers 9 of oblong rectangular form suitably fixed together side-by-side and fitting in said body 1 to extend lengthwise across said body with a slight clearance between the same and the sides of said body so that a flanged cover 11 may be fitted over said unit 7 to close the same while in said body 1. To facilitate cleaning the unit 7, the corners of the container unit 7 are rounded, as at 12.

An electric heating unit 13 is provided for removably positioning in the bottom of the body 1. This unit comprises an annular flat heating element 15 in the form of an insulation covered coil 17 and which is suitably fixed on and supported by a pair of cross-bars 19 of a U-shaped element mounting frame 21 fitting in the bottom of the body 1 and supporting said element horizontally in slightly elevated position and spaced from but closer to one end 23 of the body 1 than the other end 25 for a purpose presently seen.

An electric plug cord 27 for plugging in to a house circuit is provided for leading into the body 1 and is suitably electrically connected to the coil 17 and detachably attached by a sleeve 29 on an upstanding finger 31 on one side of the frame 21.

The multiple container unit 7 is adapted to seat on the heating unit 15 and to be centered thereon by said finger 31 and another similar finger 33 on said side of the frame 21, said fingers for this purpose forming a pair of confining fingers for said unit 7 arranged upon opposite sides of the heating unit 15.

The usual latches 35, 37 on the cover 3 and body 1 provide for retaining said cover closed.

As will now be seen, the multiple container unit 7 when positioned in the body 1 divides said body into a small compartment 39 on one side of said unit and a larger compartment 41 on the other side of said unit 15, both communicating. These compartments, and said unit 7, provide for carrying a number of different kinds of foods in the body 1 in separated position for warming of all foods therein. The compartments 39, 41 may be opened while the multiple container unit 7 may be kept closed by the cover 11 so that liquids or foods may be kept hot or warm to be used at will. The multiple container unit 7 and heating unit 15 may be readily removed out of said body 1 so that the lunch box may be used in the usual manner.

The foregoing will, it is believed, suffice to impart a clear understanding of my invention without further explanation.

Manifestly, the invention is susceptible of modification without departing from the inventive concept and right is herein reserved to modifications falling within the scope of the appended claim.

What I claim is:

In a lunch box having a rectangular body including ends, sides and a bottom, a U-shaped frame resting on said bottom and fitting between said sides and ends, cross-bars on said frame intermediate its ends and fixed thereto, an annular flat heating element fixed on said cross-bars for removal with said frame, said heating element being spaced from said sides and ends of the body and elevated above said bottom by said frame and cross-bars for circulation of air around and under said element, a container in said body seating on said element and spaced from said ends, and a pair of fingers upstanding from the frame at opposite sides of the container and confining said container therebetween in spaced relation to the ends of the container to provide for air space between the container and the ends of the body.

References Cited in the file of this patent

UNITED STATES PATENTS

| 2,513,218 | Turnipseed | June 27, 1950 |
| 2,545,127 | Wnuk | Mar. 13, 1951 |
| 2,664,491 | Kenney | Dec. 29, 1953 |